US006504936B1

(12) United States Patent
Gutierrez

(10) Patent No.: US 6,504,936 B1
(45) Date of Patent: Jan. 7, 2003

(54) AMPLIFIER SIGNAL DISTRIBUTION MODULE

(76) Inventor: Juan Carlos Gutierrez, 2660 53rd St. SW., Naples, FL (US) 34116

(*) Notice: Subject to any disclaimer, the term of this patent is extended or adjusted under 35 U.S.C. 154(b) by 0 days.

(21) Appl. No.: 09/164,177

(22) Filed: Sep. 30, 1998

(51) Int. Cl.[7] ............................ H04B 3/00; H04R 5/02; H04R 1/02; H01R 25/00; H02B 1/00

(52) U.S. Cl. ......................... 381/77; 381/300; 381/334; 439/638; 361/600

(58) Field of Search ............................ 381/300, 28, 77, 381/82, 334, 120, 118; 174/50; 330/54

(56) References Cited

U.S. PATENT DOCUMENTS 4,670,709 A * 6/1987 Iredale ........................ 324/73
5,170,327 A * 12/1992 Burroughs .................. 361/392
5,255,322 A * 10/1993 Farinelli et al. .............. 381/84

OTHER PUBLICATIONS

Radio Shack Catalog, 1992, Radio Shack, 1993 Catalog, pp. 96, 107 & 115.*

* cited by examiner

*Primary Examiner*—Forester W. Isen
*Assistant Examiner*—Elizabeth McChesney
(74) *Attorney, Agent, or Firm*—William F. Hamrock, PA

(57) ABSTRACT

The present invention is an amplifier signal distribution module ideally suited for use in public announcement systems, concerts, and live sound reinforcement. This present invention will be used with conventional components of an audio system. In use, the present invention will receive a combined signal from a signal processor and transmit the signal to a cross-over. The cross-over will transmit the signal to amplifiers which will send the signal back to the present invention. The signal is re-distributed to a final output source, such as speakers. Each input, output, and input/out sections of the present invention includes various sets of connectors for accepting any conventional form used with the conventional components. Such an arrangement will drastically reduce the time and cabling generally associated in the process of setting up audio system for live audio performance.

19 Claims, 5 Drawing Sheets

AMPLIFIER SIGNAL DISTRIBUTION MODULE

BACKGROUND OF THE INVENTION

1. Field of the Invention

The present invention relates generally to a distribution apparatus, also known as an amplifier signal distribution module, ideally suited for use in public announcement (PA) systems, concerts, live sound reinforcement, and the like, and more particularly to a distribution apparatus designed and configured to receive a compact audio signal from a particular source, such as a signal processor, transmit the signal to a second source, such as power amplifiers, receive the signal from the second source and re-distribute the received signal to a final output source, such as speakers, while drastically reducing the time and cabling generally associated in the process of setting up an audio system for live audio performance.

2. Description of the Prior Art

Audio systems, generally those associated with public announcement (PA) systems, concerts, live sound reinforcement, and the like, are well known in the art. These systems require an enormous amount of time to properly connect and implement, due to the extensive amount of equipment needed and the precision required to achieve pristine sound.

As such, live audio engineers are constantly searching for ways to simplified the process, to consequently reduce the time and costs, without sacrificing quality. One method which is used is to pre-wire various components of the audio system and maintain them within a particular storage device, known in the industry as a rack. These racks can easily be transported from one location to the next and electrically and mechanically be connected and disconnected, to reduce the time required to install and disassemble the audio system.

Though successful, this method still suffers drawbacks. One obvious drawback is that even though the components are stored on various racks, the number of cables required for successful connection still need to be reduced as much as possible. The excessive amount of cables is unsightly and also provides a potentially hazardous environment. This arrangement also produces a system where cable dislodgment is possible, causing an unwelcome disruption in the sound system. Further still, if a problem does occur with the sound system, trouble shooting still remains a difficult process due to the large volume of wires and components.

Accordingly, it is seen that there exists a need to further simplify the process of setting up live sound systems without comprising on quality. The process should not only reduce time, but reduce the number of cables required to provide a successful sound system.

As will be seen, the present invention achieves its intended purposes, objectives and advantages, by accomplishing the needs as identified above, through a new, useful and unobvious combination of component elements, which is simple to use, with the utilization of a minimum number of functioning parts, at a reasonable cost to manufacture, assemble, test and by employing only readily available material.

SUMMARY OF THE INVENTION

The present invention is an amplifier signal distribution module which will receive a combined audio signal from a particular source, such as a signal processor, and transmit the signal to a second source, such as power amplifiers. The signal is then transmitted back to the present invention. This received signal is re-distributed to a final output source, such as speakers.

The amplifier signal distribution module includes various sections, wherein each section includes a plurality of input, output, and/or input/output means. The input, output, and/or input/output means are different sets of connectors. Each set of connectors within each section has a different structural configuration. For example, one section can include connectors in the form of ¼ inch jacks and a second set as XLR connectors. All the sets within each section are electrically coupled to each other.

Having the plurality of different configurations for the connectors within each section provides a device which is designed and configured to accept any known connectors from any particular conventional component of an audio system. The use of different configurations for the connections will also provide the user with a plurality of options for hook-up to inherently provide for a product which is universal, user friendly and which will reduce time and costs generally associated with audio systems used for public announcement (PA) systems, concerts, live sound reinforcement, and the like.

The amplifier signal distribution module comprises a substantially rectangular configuration having an exterior shell, an interior area, a front panel and a rear panel. The exterior shell will protect the electrical wiring within the interior area. Various connectors are located on the front and rear panels for easing connections between the module and various components used with the sound system Multi-conductor cables are preferably used for properly coupling the various components within the system and for inherently reducing the amount of cable required to run a successful audio system. For added versatility, the module of the present invention can include connecting ears to enable the unit to be removably secured within a conventional rack. Such an arrangement will provide easy accessibility and transportability of the unit and system.

Accordingly, it is the object of the present invention to provide for a distribution module which will overcome the deficiencies, shortcomings, and drawbacks of prior sound systems and methods thereof.

Another object of the present invention is to provide for a distribution module which is compatible with 16, 8, 4, 2, and 1 ohm loads, which is both mono and stereo, and that can be used with full range, two-way, three-way, four-way and stage monitoring systems.

Still another object of the present invention is to provide a distribution module which can easily and quickly be re-configured, and optionally, can be connected in series with other distribution modules when used with larger and more powerful audio systems.

A further object of the present invention is to provide for a distribution module that enables testing of any particular component without disassembling any portion or any component of the overall system.

Yet another object of the present invention, to be specifically enumerated herein, is to provide a distribution module in accordance with the preceding objects and which will conform to conventional forms of manufacture, be of simple construction and easy to use so as to provide a device that would be economically feasible, long lasting and relatively trouble free in operation.

The present invention meets the requirements of the simplified design, compact size, low initial cost, low operating cost, ease of installation and maintainability, and minimal amount of training to successfully employ the invention.

The foregoing has outlined some of the more pertinent objects of the invention. These objects should be construed to be merely illustrative of some of the more prominent features and application of the intended invention. Many other beneficial results can be obtained by applying the disclosed invention in a different manner or modifying the invention within the scope of the disclosure. Accordingly, a fuller understanding of the invention may be had by referring to the detailed description of the preferred embodiments in addition to the scope of the invention defined by the claims taken in conjunction with the accompanying drawings.

BRIEF DESCRIPTION OF THE DRAWINGS

Similar reference numerals refer to similar parts throughout the several views of the drawings.

DESCRIPTION OF THE PREFERRED EMBODIMENTS

Figure 1:
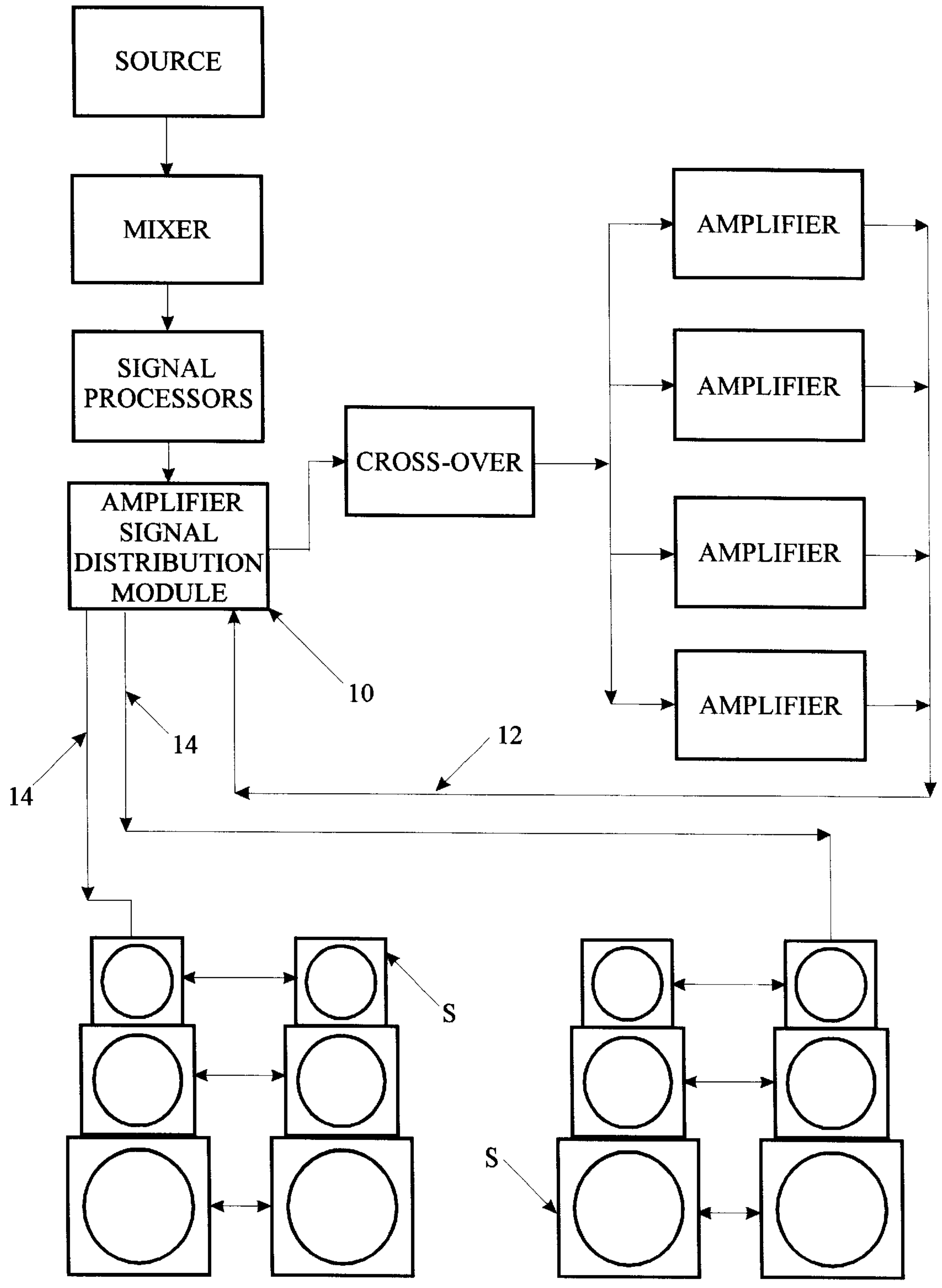
FIG. 1 is a block diagram of the distribution module of the present invention coupled to conventional components for a four way audible system.

With reference to the drawings, in particular to FIG. 1, the present invention, an amplifier signal distribution module, denoted by reference numeral 10, is shown used in a typical hook-up system. As seen in this block diagram, the present invention 10 can be used with a variety of systems, including, but not being limited to, full range, two-way, three-way, four-way (shown in this block diagram), and stage monitoring systems. By coupling this distribution module with conventional components, a system is provided that is easy to use, time efficient, and one that is aesthetically pleasing, by reducing the clutter appearance of the cables used with audio equipment.

As seen in FIG. 1, a conventional hook-up for audio systems includes a source (SOURCE), such as a tape, microphone, instrument, or the like. This source is coupled to a mixer (MIXER). Mixers are used to combined all the signals into a combined single signal. This will allow for the combined signal to be transferred to the various signal processors (SIGNAL PROCESSOR). Conventionally, from the various signal processors, the combined signal would be sent to the cross-over (CROSS-OVER). In this traditional arrangement, the signal would then be transmitted to the amplifiers and then to the appropriate output source, such as speakers (S), as illustrated. In this arrangement, it is seen that the various components used in the hook-up inherently provide for a plurality of connectors (inlet/outlet coupling means used for receiving the cable to enable transmission of the combined signal) to exists. This existence will provide for a final set-up which is cumbersome and time consuming to install.

To reduce this time and tedious task, the present invention 10 is used and is located between the signal processors (SIGNAL PROCESSORS) and the cross-over (CROSS-OVER). In this arrangement, the combined signal is routed to the cross-over. From the cross-over, the signal is sent to the amplifier(s) and re-routed back to the invention or the signal distribution module 10 via input line 12. From the signal distribution module 10, the signal is sent to the output source, as seen in this figure as speakers (S) via output lines 14. Output line 14 can be a multi-conductor cable so as to provide for the signal to be transmitted to each output source via a single cable. This will drastically reduce the number of cables conventionally used for coupling the amplifiers to speakers. In this arrangement, the user merely inserts the conventional component's connector (input versus output connectors) to the appropriate location (input/output area of the distribution module) and appropriate connector located on the invention.

It is noted that the number of amplifiers and speakers is dependent upon the number needed for the particular environment. These items can be increased or decreased when deemed appropriate by the individual(s) assembling the sound system. For convenience, it is further noted that the amplifier(s) and distribution module 10 will be located within the same rack. This will ease the installation and connection as well as facilitate the disassembling of the particular sound system.

The object of the present invention 10 is to simplify the process of the installing, disassembling and testing the various components of an audible system, particularly in the speaker/amplifier arena. To produce an acceptable and adequate sound system, various components are needed and are utilized. Unfortunately, each component may have a different configuration of connectors (coupling means used to electrically couple one component to another component). Thereby, making installation a tedious and time-consuming task. To address this problem the present invention 10 includes an apparatus which can easily accept all known connectors and be electrically coupled to the output source (S). This will produce a universal unit which substantially reduces the time and the amount of cable previously needed to assemble a conventional audible system.

Figure 2:
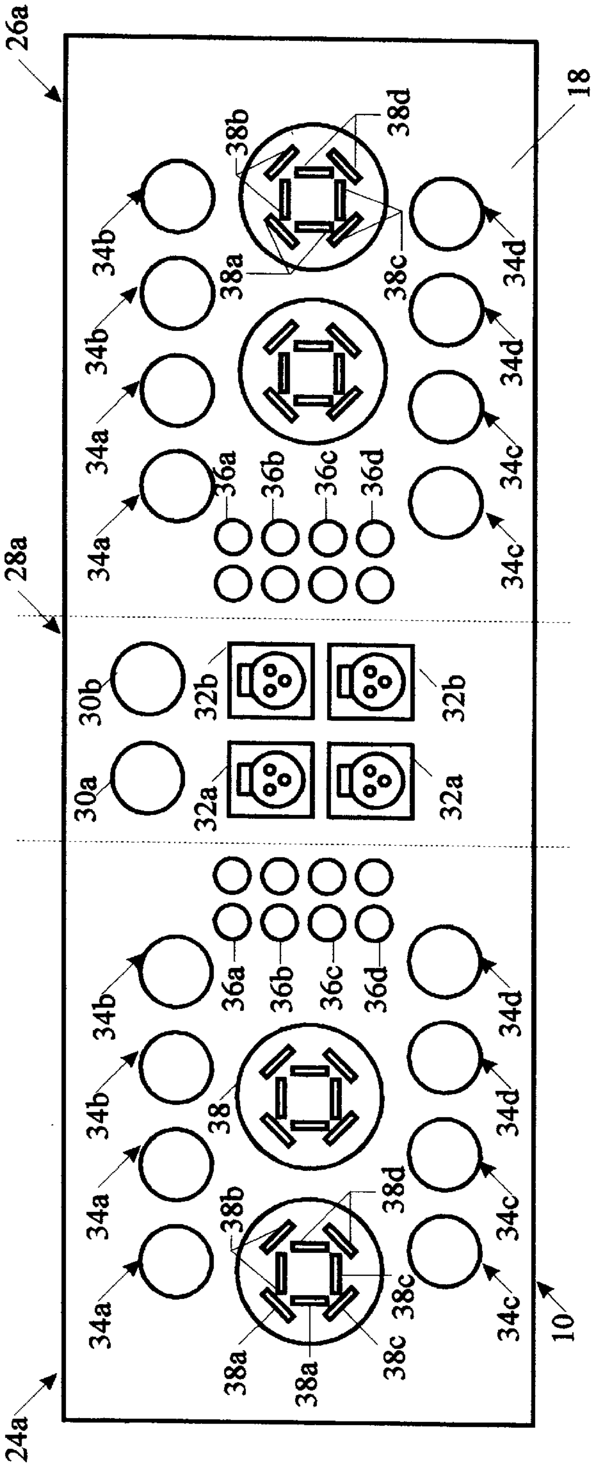
FIG. 2 is a front view of the distribution module of the present invention.
Figure 3:
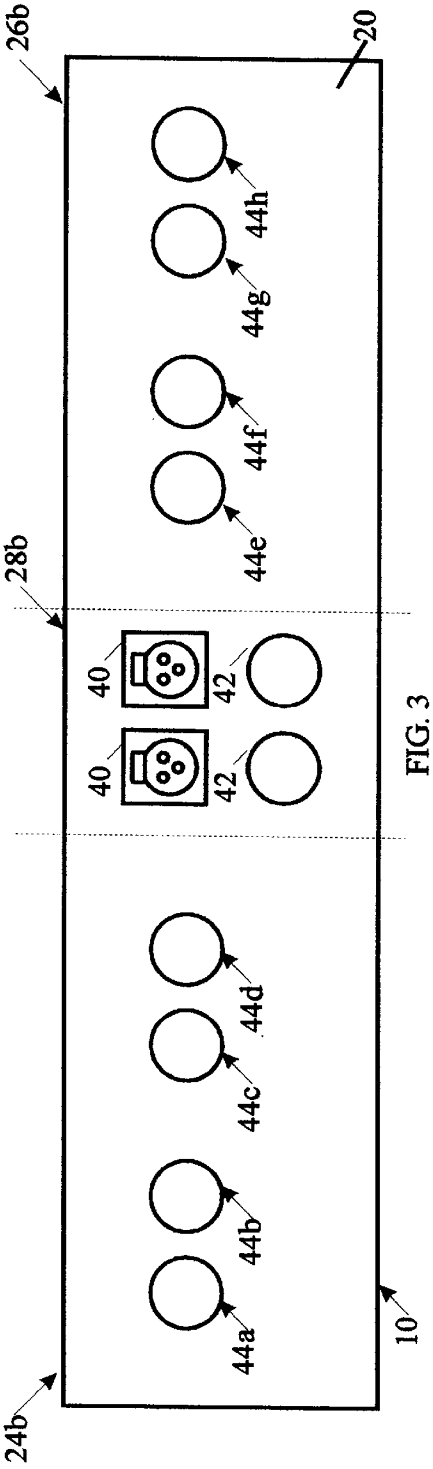
FIG. 3 is a rear view of the distribution module of the present invention.
Figure 4:
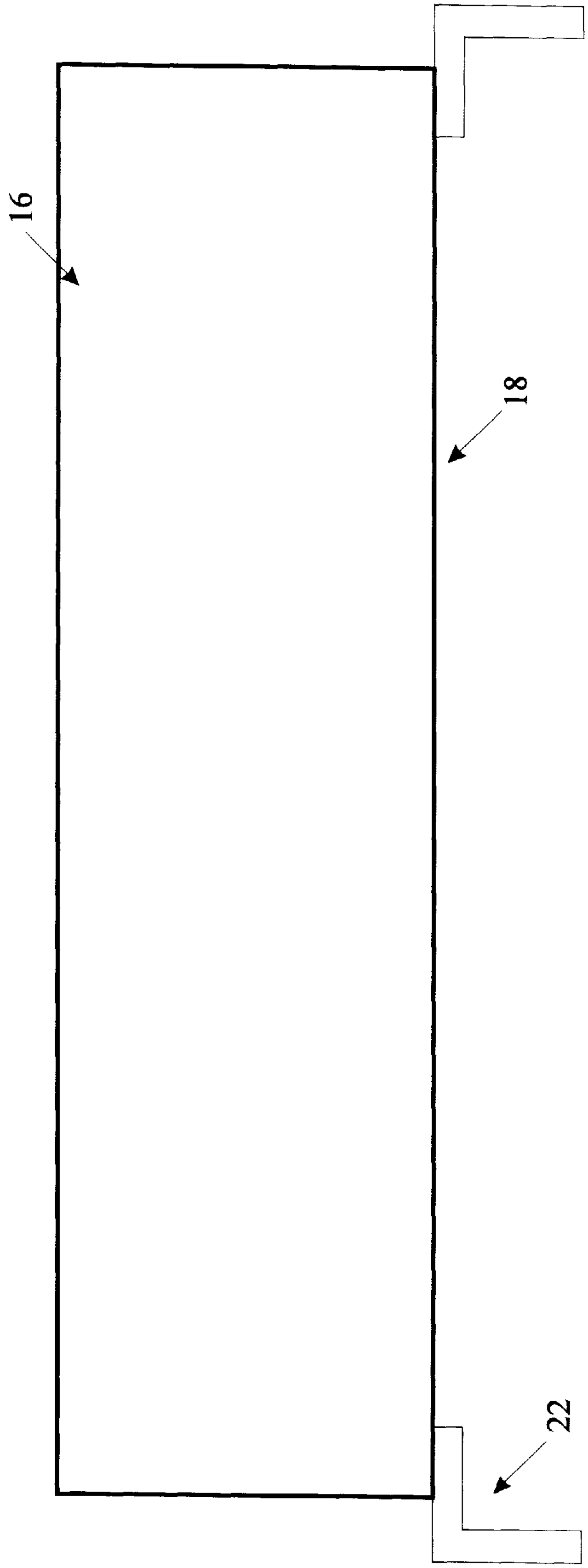
FIG. 4 is a top view of the distribution module of the present invention.

As seen in further detail in FIGS. 2–4, the amplifier signal distribution module 10 is a substantially rectangularly shaped housing having an exterior shell 16, with a front panel 18 (see FIG. 2) and a rear panel 20 (see FIG. 3). For added versatility, conventional connecting ears 22 (see FIG. 4) extend outwardly from the front panel 18 to provide for the module 10 to be removably secured to a conventional rack. These ears are conventional in shape so as to provide for the unit 10 of the present invention to be versatile and adaptable to conventional audible systems.

As seen in FIGS. 2 and 3, each panel 18 and 20, respectfully, is divided into sections. The front panel includes a first section 24*a*, a second section 26*a*, and a middle section 28*a*. The first section is known as the first channel and the second section is known as the second channel. The middle section is known as the input/output section. The first and second channel sections 24*a* and 26*a* of the front panel 18 include a plurality of output channels. These output channels from the first and second sections will be coupled to the output source, such as speakers. The input/output section 28*a* of the front panel will receive the combined signal from the signal processor(s). If it is desirable to use more than one amplifier signal distribution module 10, then the subsequent module will be coupled to this input/output section 28*a*.

The rear panel 20 includes a first channel section 24*b*, a second channel section 26*b*, and an output section 28*b*. The first and second channel sections 24*b* and 26*b* of the rear panel 20 include a plurality of input channels. These input channels from the first and second sections will couple the amplifier signal distribution module 10 to the amplifier(s). The output section 28*b* will be coupled to the cross-over(s).

It is noted that the sections are divided via dashed lines and the lines are used for illustrative purposes only.

First and second channel sections 24*a* and 26*a* in the front panel 18 are substantially identical in design and configuration First and second channel sections 24*b* and 26*b* in the rear panel 20 are substantially identical in design and configuration. The use of two channels in both the front and rear panels provides the option of using either mono (only the first channel section is utilize), stereo (wherein the both the first and second channel sections are used simultaneously), or two mono (one per channel) with different signals.

To accommodate the various connectors used within the industry, the input/output section 28*a* of the front panel 18 includes jack connectors 30*a* and 30*b* and XLR male and female connectors 32*a* and 32*b*. The jack connectors 30*a* and the XLR connectors 32*a* are used for input. Accordingly, the signal from the signal processor(s) will input into this module 10 via this section. The signal processor(s) is coupled to either connectors 30*a* or 32*a*, dependent upon the type and style of connector(s) provided on the conventional signal processor(s). Parallel jack connectors 30*b* and XLR male connectors 32*b* are provided should it be desirable to connect this module 10 to a second or subsequent module.

Each channel section 24*a* and 26*a* of the front panel 18 is coupled to the desired output source, in the example illustrated in FIG. 1, the output source includes speakers. As seen in FIG. 2, the channels sections include a plurality of configurations for the connectors to accommodate the various conventional connectors used with conventional output sources, such as speakers. As shown, outlets 34 will be used for jacks (¼"), outlets 36 will be used for banana jacks as well as bare wires, and outlets 38 will be used for an 8-conductor multi-pin connector. Please note that a, b, c, and d signify high, mid, low, and sub-frequencies, respectively. Ideally, outlet 38 would reduce the number of cables used in the overall system, by allowing a single multi-conductor cable to couple the distribution module 10 to the desired output source.

The output section 28*b*, of the rear panel 20, illustrated in FIG. 3, will be coupled to the cross-over. This section includes XLR male and female connectors 40 and jack (¼") connectors 42. This provides an option for the type and size connector(s) used for the cross-over(s). The first and second channel sections receive the signals from the amplifiers output via input 44*a*–44*h*. The input channels 44*a*–44*h* are preferably jacks (¼") connectors.

Hence, the overall product is a module specifically design to be user friendly and to be accessible to any type or style of coupling units. The location of each input and output within the front and rear panels are designed to reduce the number and bulkiness of cables, by providing a compact and user friendly unit. Additionally, the unit is compatible with 16, 8, 4, 2, and 1 ohm loads, which is both mono and stereo, and that can be used with full range. Accordingly, the amplifier signal distribution module 10 of the present invention includes a front panel 18 and a rear panel 20 having a plurality of different sets of connectors, within each particular section (input, output, and/or input/output) which are universally known and that will allow for any connectors from other conventional audio/stereo components to be successfully coupled thereto.

Though not separately illustrated, it is noted that the front and rear panels can include indicia or labeling within the vicinity of each connector so as to further ease in the installation process. Additionally, LED's can be added in each and every connector to indicated signal present in the front, and optionally, in the rear of the panels.

Figure 5:
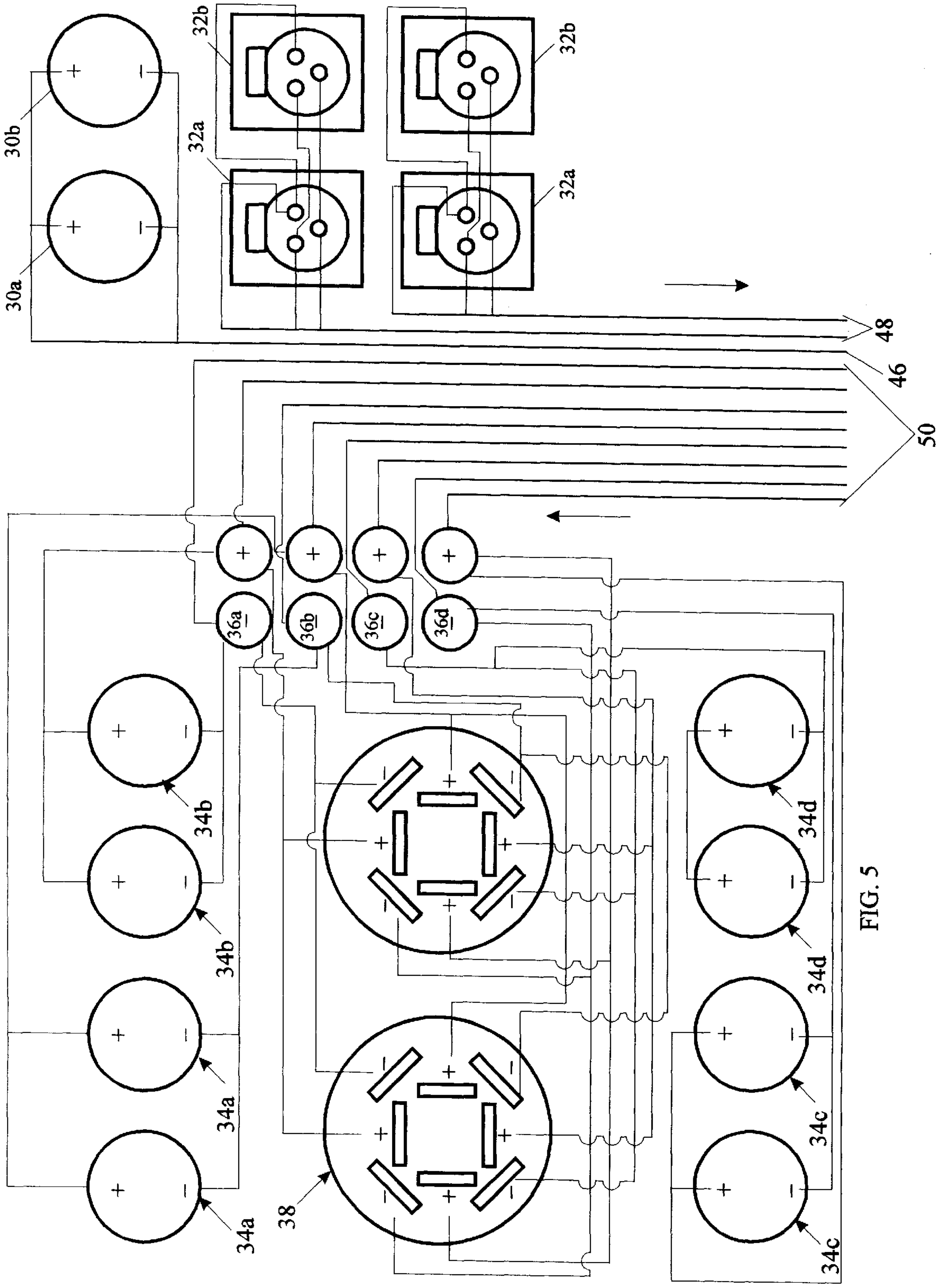
FIG. 5 is an internal schematic of the wiring pattern used on the first channel section of the distribution module of the present invention.
Figure 6:
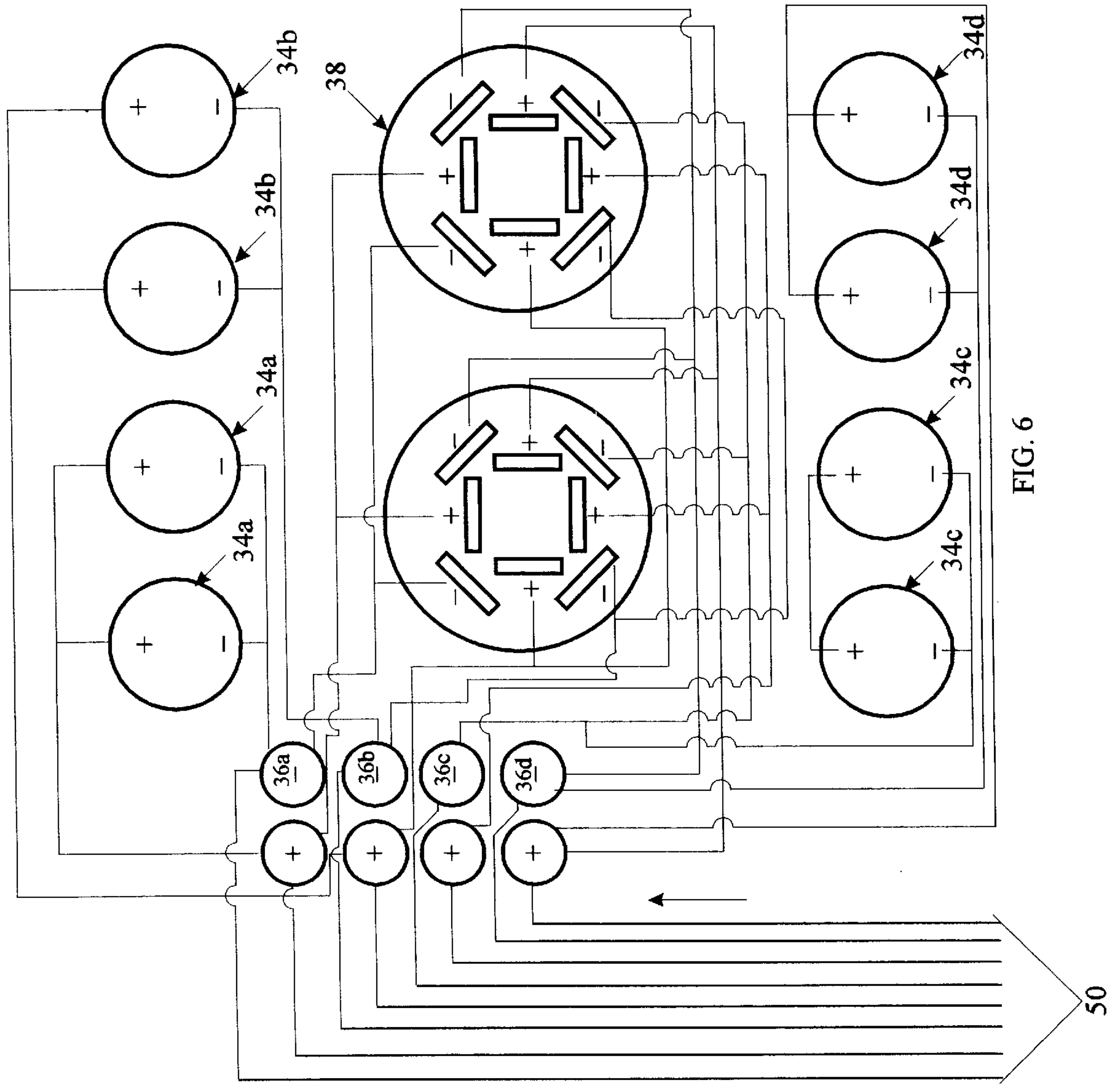
FIG. 6 is an internal schematic of the wiring pattern used on the second channel section of the distribution module of the present invention.

To allow for such a universal system, the various connectors for a particular section must be coupled electrically. FIGS. 5 and 6 illustrate the internal view of the electrical wiring used with the distribution module 10 of the present invention. As seen in the drawings, the full range signal from the signal processor is received within the present invention 10 via the unbalance jacks 30*a* and 30*b* or balanced XLRs 32*a*. From the input section, the signal is sent to the rear of the unit to enable output from the rear of the panel. Hence unbalanced jacks, 30*a* and 30*b*, and balanced XLRs 32*a* of the front panel are electrically coupled to unbalance jacks 40 and balanced XLRs 42, respectively, of the rear panel via lines 46 and 48. This will provide for the signal to travel from the front of the unit to the rear and through outputs couplings either unbalance jacks 40 or balanced XLRs 42, dependent upon what type of connectors are used on each conventional component. From the output section 28*b* of the rear panel, the signal is sent to the crossover and amplifiers before returning to the amplifier signal distribution module 10.

The amplifiers are electrically coupled to the rear panel via connectors 44*a*–44*d* and, optionally dependent upon the final audio system, connectors 44*e*–44*h* (see FIG. 3). The rear panel is coupled electrically to the front panel by directly internally connecting connectors 36*a*–36*d* to connectors 44*a*–44*d* on the first channel of each panel and also by directly internally connecting connectors 36*a*–36*d* to connectors 44*e*–44*h* of the second channel of each panel via lines 50. Thereby, this will allowed for the received signal to be transmitted from the rear panel to the front panel for re-distribution to the final output source.

Connectors 36*a*–36*d* are the main recipients of the amplifier signal in the front panel from where it is distributed to connectors 34*a*–34*d* and/or multi-pin connectors 38. From the connectors 34*a*–34*d* and/or pin connector 38, the signal is sent to its designated output source, such as speakers, as illustrated in FIG. 1. The use of the multi-pin connectors allows the user to eliminate considerable amounts of cable by matching these connectors with a multi-conductor cable, inherently enabling a four-way speaker system to operate utilizing a single cable per set of speakers. Accordingly, the present invention is an apparatus which will simplify the speaker-amplifier hook-up by pre-wiring inside a two rack space module all the different configurations concerning this area. Such an arrangement will provide for an apparatus which is universal to all audio components. Further, rendering input connectors to the amplifiers from the main source in the same module provides a system which is effortless in assembly and operation.

While the invention has been particularly shown and described with reference to an embodiment thereof, it will be understood by those skilled in the art that various changes in form and detail may be made without departing from the spirit and scope of the invention.

I claim:

1. A distribution module comprising:

a housing having a front panel and a rear panel;

said front panel includes at least one output section and an input/output section;

said output section constitutes a channel portion;

said rear panel includes at least one input section and an output section;

said at least one input section of said rear panel constitutes a channel section;

said at least one output section of said front panel including at least two different sets of connectors, each set having a different structure and configuration;

said at least two different sets of connectors being electrically coupled to each other in parallel;

said input section of said rear panel is electrically connected to one set of connectors of said output section of said front panel providing said input section to be solely electrically connected to said output section of said front panel; and said input/output section of said front panel being solely electrically coupled to said output section of said rear panel.

2. A distribution module as in claim 1 wherein said output section of said rear panel including at least two different sets of connectors, each set of connectors from said output section of said rear panel having a different structure and configuration, and said at least two different sets of connectors from said output section of said rear panel being electrically coupled to each other in parallel.

3. A distribution module as in claim 1 wherein said input/output section of said front panel including at least two different sets of connectors, each set of said input/output section having a different structure and configuration, and said at least two different sets of connectors of said input/output section being electrically coupled to each other.

4. A distribution module as in claim 1 wherein said front panel includes a second output section, said rear panel includes a second input section, and said second input section of said rear panel is electrically connected to said second output section of said front panel.

5. A distribution module as in claim 4 wherein said second output section of said front panel including at least two different sets of connectors, each set of connectors from said second output section having a different structure and configuration, and said at least two different sets of connectors of said second output section of said front panel being electrically coupled to each other in parallel.

6. A distribution module as in claim 1 wherein said at least two different sets of connectors from said output section of said front panel is selected from the group consisting of ¼ inch jack, banana jacks, and 8-conductor multi-pin connector.

7. A distribution module as in claim 2 wherein said at least two different sets of connectors from said output section of said rear panel including ¼ inch jacks and XLR connectors.

8. A distribution module as in claim 3 wherein said at least two different sets of connectors from said input/output second of said front panel including ¼ inch jacks and XLR connectors.

9. A distribution module as in claim 5 wherein said at least two different sets of connectors from said second output section of said front panel is selected from the group consisting of ¼ inch jack, banana jacks, and 8-conductor multi-pin connector.

10. A distribution module as in claim 1 wherein an attaching device extends outwardly from said front panel.

11. A distribution module comprising:

a first receiving system for receiving an audible signal from a first source;

a distributing system being solely and electrically coupled to said first receiving system via a first wiring system for distributing said signal to a second source;

said first wiring system being free from electrical components;

a second receiving system for receiving said distributed signal from said second source;

a re-distributing system for re-distributing said received signal to a final source;

said second receiving system being solely and electrically coupled via a second wiring system to said re=distributing system;

said second wiring system being free from electrical components; and said first receiving system, said distributing system, said second receiving system and said re-distribution system constitutes a modular unit and each modular unit is a singular entity.

12. A distribution module as in claim 11 wherein said first receiving system includes at least two different sets of connectors, each set having a different structure and configuration, and said at least two different sets of connectors being electrically coupled to each other in parallel.

13. A distribution module as in claim 11 wherein said distribution system includes at least two different sets of connectors, each set having a different structure and configuration, and said at least two different sets of connectors being electrically coupled to each other in parallel.

14. A distribution module as in claim 11 wherein said re-distributing system includes at least two different sets of connectors, each set having a different structure and configuration, and said at least two different sets of connectors being electrically coupled to each other in parallel.

15. A distribution module as in claim 12 wherein said at least two different sets of connectors from said receiving system includes ¼ inch jacks and XLR connectors.

16. A distribution module as in claim 13 wherein said at least two different sets of connectors from said distributing system includes ¼ inch jacks and XLR connectors.

17. A distribution module as in claim 14 wherein said at least two different sets of connectors from said re-distributing system is selected from the group consisting of ¼ inch jack, banana jacks, and 8-conductor multi-pin connector.

18. A distribution module as in claim 11 wherein said second receiving system includes two sections.

19. A distribution module as in claim 11 wherein said re-distributing includes two sections.

* * * * *